US010821528B2

(12) United States Patent
Hollfelder et al.

(10) Patent No.: US 10,821,528 B2
(45) Date of Patent: Nov. 3, 2020

(54) CUTTING TOOL COMPRISING A CUTTING ELEMENT RELEASABLY ATTACHED TO A SUPPORT MEMBER BY MEANS OF A CLAMPING JAW

(71) Applicant: GUEHRING KG, Albstadt (DE)

(72) Inventors: Hans-Peter Hollfelder, Fuerth (DE); Juergen Thanner, Hilpolstein (DE)

(73) Assignee: GUEHRING KG, Albstadt (DE)

( * ) Notice: Subject to any disclaimer, the term of this patent is extended or adjusted under 35 U.S.C. 154(b) by 0 days.

(21) Appl. No.: 16/152,900

(22) Filed: Oct. 5, 2018

(65) Prior Publication Data

US 2019/0105719 A1  Apr. 11, 2019

Related U.S. Application Data

(63) Continuation of application No. PCT/DE2017/000091, filed on Apr. 5, 2017.

(30) Foreign Application Priority Data

Apr. 6, 2016 (DE) .................. 10 2016 205 658

(51) Int. Cl.
  *B23C 5/22* (2006.01)
  *B23B 51/00* (2006.01)
  *B23B 27/16* (2006.01)

(52) U.S. Cl.
  CPC ........ *B23C 5/2239* (2013.01); *B23B 27/1625* (2013.01); *B23B 51/00* (2013.01);
  (Continued)

(58) Field of Classification Search
  CPC ... B23B 27/04; B23B 27/086; B23B 27/1625; B23B 29/14; B23B 2205/02; B23C 5/2219; Y10T 407/2286
  See application file for complete search history.

(56) References Cited

U.S. PATENT DOCUMENTS 1,776,335 A * 9/1930 Pierre Elie ............ B23B 27/164
                                                407/109
3,156,031 A * 11/1964 Gustav ................. B23B 27/1633
                                                407/109

(Continued)

FOREIGN PATENT DOCUMENTS

CH       615615     2/1980
DE       2229136    12/1972
                   (Continued)

OTHER PUBLICATIONS

International Search Report (with English Translation) and Written Opnion of the International Searching Authority from a corresponding International patent application (WO 2017/174055) bearing a mailing date of Sep. 29, 2017, 13 pages.

*Primary Examiner* — Alan Snyder
(74) *Attorney, Agent, or Firm* — Burr & Brown, PLLC (57) ABSTRACT

The invention relates to a cutting tool, in particular a rotating machining tool, comprising a support member, a cutting element that is releasably clamped to the support member, and a clamping jaw which is located on the support member, can be secured by means of a clamping screw and clamps the cutting element against the support member. According to the invention, a lifting element is provided between the support member and the clamping claw; when the clamping screw is unscrewed, said lifting element lifts the clamping jaw off the cutting element located on the support member.

28 Claims, 9 Drawing Sheets

(52) U.S. Cl.
CPC ....... *B23B 2205/02* (2013.01); *B23B 2251/50* (2013.01); *B23C 2210/161* (2013.01)

(56) References Cited

U.S. PATENT DOCUMENTS

| | | | |
|---|---|---|---|
| 3,731,356 A | 5/1973 | Gowanlock | |
| 3,837,058 A * | 9/1974 | Barkley | B23B 27/1659 407/103 |
| 3,939,540 A * | 2/1976 | Novak | B23B 27/04 407/107 |
| 4,050,127 A | 9/1977 | Bodem et al. | |
| 4,286,901 A * | 9/1981 | Eckle | B23B 27/1666 407/109 |
| 4,480,950 A * | 11/1984 | Kraft | B23B 27/1651 407/103 |
| 4,721,422 A | 1/1988 | Konwal | |
| 5,733,073 A * | 3/1998 | Zitzlaff | B23B 27/16 407/102 |
| 5,993,118 A * | 11/1999 | Brask | B23B 27/04 407/108 |
| 6,139,227 A * | 10/2000 | Schafer | B23B 27/04 407/109 |
| 6,146,062 A * | 11/2000 | Jansson | B23B 27/1666 407/107 |
| 6,168,357 B1 * | 1/2001 | Coutat | B23B 27/04 407/110 |
| 8,622,662 B2 | 1/2014 | Heckel et al. | |
| 9,649,694 B2 * | 5/2017 | Eriksson | B23B 27/1677 |
| 2012/0070241 A1 | 3/2012 | Heckel et al. | |
| 2013/0129438 A1 * | 5/2013 | Ben Amor | B23B 27/1651 407/109 |
| 2014/0064862 A1 * | 3/2014 | Breisch | B23B 27/10 407/11 |
| 2014/0133924 A1 * | 5/2014 | Oren | B23B 29/043 407/11 |
| 2015/0231704 A1 | 8/2015 | Eriksson | |

FOREIGN PATENT DOCUMENTS

| | | |
|---|---|---|
| DE | 2514943 | 10/1975 |
| DE | 2652153 | 6/1977 |
| DE | 2653222 | 6/1977 |
| DE | 8503545 | 5/1985 |
| DE | 9015969 | 4/1991 |
| DE | 4240295 | 6/1993 |
| DE | 4430197 | 3/1996 |
| DE | 10319957 | 11/2004 |
| DE | 102008063127 | 7/2010 |
| EP | 2719487 | 4/2014 |
| SU | 837571 | 6/1981 |

* cited by examiner

CUTTING TOOL COMPRISING A CUTTING ELEMENT RELEASABLY ATTACHED TO A SUPPORT MEMBER BY MEANS OF A CLAMPING JAW

The invention relates to a cutting tool comprising a support member and a cutting element releasably attached to the support member by means of a clamping jaw.

Such a cutting tool is known for example from DE 10 2008 063 127 A1. This publication shows and describes a rotationally driven, rotating cutting tool comprising a support member and a cutting element releasably attached to a support member by means of a clamping jaw. The clamping jaw is machined from the support member and is connected to the support member via a material joint. Support member and clamping jaw are thus made of one and the same material. The cutting element is located in a recess in the support member, which can be accessed on the front and circumferential side. The clamping of the clamping jaw against the cutting element located in the recess takes place by means of a clamping screw, which supports a through bore in the clamping jaw in a rotationally movable manner and which is screwed in the support member in a threaded bore, which is aligned with the through bore.

The cutting tool specified in the above-mentioned publication is characterized by a construction, which is kept relatively simple and which provides for an arrangement and attachment of a cutting element on the support member, which is stable and can be accomplished quickly with simple hand movements. The one-piece formation of the support member and of the clamping jaw, however, requires a precise and thus relatively complex milling of a support member blank. The machining of the clamping jaw from the support member requires the formation of an L-shaped slit in two milling steps, wherein the size and length of the L-shaped slit, which is created by means of the milling, determine the flexibility and the traverse of the clamping jaw relative to the support member. A slit, which is dimensioned too narrowly, reduces the traverse of the clamping jaw towards the support member. This can be disadvantageous in response to a cutting element change, when the cutting element size varies. A slit, which is dimensioned too large, on the other hand, comes at the expense of the stability of the clamping jaw and/or of the support member. A higher flexibility of the clamping jaw requires a longer slit or a smaller dimensioned material joint, respectively. Retroactively, the one-piece formation allows additional constructional measures for correcting the flexibility and the traverse of the clamping jaw only to a limited extent. For this purpose, additional complex machining of the support member or of the clamping jaw, respectively, would always be required for this purpose. In addition, the one-piece formation always requires a replacement of the unit of support member and clamping jaw in response to damages to the support member and/or to the clamping jaw.

A cutting tool comprising a support member and a clamping jaw formed in one piece with a support member, is also known from DE 90 15 969.1 U1 or DE 44 30 197 A1. In contrast to the above-discussed DE 10 2008 063 127 A1, a clamping jaw in the form of a two-sided lever is proposed in DE 90 15 969 U1 or DE 44 30 197 A1, wherein a cutting element, which is to be clamped, is located on the one side of a material joint, and a clamping screw, which clamps the clamping jaw against the cutting element, is located on the other side of the material joint.

In addition to the above-described one-piece formations of support member and clamping jaw, solutions are known, in the case of which the clamping jaw is realized as a component, which is separate from the support member and is attached to the support member by means of structural measures as well as by means of a clamping screw. Examples for such solutions can be found in DE 26 52 153 A1, DE 2 229 136 A or DE 103 19 957 A1. In the case of the solutions proposed in these publications, the clamping jaws in each case engage with play with a groove- or trough-shaped recess on a support member or a further element, respectively, placed between clamping jaw and support member. In the position, which is more or less specified by means the engagement, the clamping jaws are then in each case attached to the support member by means of a clamping screw. However, a plurality of components and/or recesses, which are technically relatively difficult to manufacture, are necessary on the support member and/or on the clamping jaw for a positionally accurate arrangement of the clamping jaw on the support member. Due to the fact that the clamping jaws thereby routinely engage with play with the recess on the support member, a positionally accurate arrangement and attachment of the clamping jaw on the support member requires large technical skills in particular when, in addition to the clamping jaw, the cutting insert, which is to be clamped by the clamping jaw, needs to be held on the support member. This is so, because, in response to a loosening of the clamping screw, it may happen that the clamping jaw and/or the cutting insert shift out of the respectively desired position on the support member. In response to a released clamping screw, the clamping jaw and/or the cutting insert can fall off the support member.

Regardless of whether the clamping jaw is formed in one piece with the support member or as a component, which is separate from the support member, or whether the clamping jaw is realized as one- or two-sided lever, the solutions of all above-mentioned publications have the disadvantage that effects can appear, which make a releasing of clamping jaw and cutting element more difficult in response to a cutting element change. In the case of the solution specified in DE 10 2008 063 127 A1, it can thus happen that the clamping jaw, which, with its front-side end section, engages with a recess on the cutting element in a positive manner, and the cutting element wedge or jam by means of frictional forces, contaminations, etc., whereby a cutting element change is hindered. In the case of the solutions proposed in DE 10 2008 063 127 A1, DE 90 15 969.1 U1 or DE 26 52 153 A1, the clamping force, which pushes the cutting element against the support member, can cease abruptly in response to a loosening of the clamping screw. This may initially facilitate the removal of the cutting element, which is to be changed, from the support member. However, the arrangement of a new cutting element on the support member may be made more difficult, because the clamping jaw is routinely held with play on the support member until the clamping screw is tightened, whereby the cutting element can shift on the support member.

The invention thus has the object of developing a cutting tool, which is characterized by a construction, which can be realized in a technically simple manner, and which, by means of few simple hand movements, provides for an arrangement of a cutting element on the support member, which is always positionally accurate and stable, as well as a simple and secure cutting element change, but which simultaneously allows for a higher flexibility with regard to the use of cutting inserts of different sizes, etc.

This object is solved by means of a cutting tool comprising the features of independent claim 1. Advantageous further developments are the subject matter of dependent claims.

A cutting tool according to the invention has a support member, a cutting element replaceably located on the support member, and a clamping jaw, which is located on the support member and can be fixed by means of a clamping screw, which clamps the cutting element against the support member. In contrast to the above-discussed prior art, the cutting tool according to the invention has a lift-off element between the support member and the clamping jaw, which lifts the clamping jaw off the cutting element located on the support member in response to releasing the clamping screw.

The lift-off element can be provided on the side of the support member or on the side of the clamping jaw. What is relevant is only that the lift-off element acts between the support member and the clamping jaw in such a way that, in response to releasing the clamping screw, it applies a force to the clamping jaw, which pushes or lifts the clamping jaw off the cutting element located on the support member.

In a preferred embodiment, the lift-off element is provided on the clamping jaw side. The clamping jaw-side arrangement of the lift-off element does not require a special adaptation or design of the support member. The lift-off element can thereby be formed as a single piece with the clamping jaw, but it can also be formed separately from the clamping jaw and can be connected to the clamping jaw by means of a substance-to-substance bond, in a non-positive and/or positive manner. The substance-to-substance bond can for example be a solder, weld or adhesive connection and the like, the non-positive connection can be a press or screw connection and the like, and the positive connection can be a bolt, pin or rivet connection and the like. The number of the components can be kept small by means of the single-piece formation as well as by means of the substance-to-substance bond, non-positive and/or positive connection. The small number of components ensures a good manageability of the cutting tool. In each of the above-mentioned exemplary embodiments, the lift-off element can project away from the clamping jaw in an elastically deformable manner in the manner of a cantilever. The elasticity and thus the force, which the lift-off element exerts on the clamping jaw in the state, in which the clamping jaw is clamped against the cutting element or support member, respectively, can be determined via the cross section, the shape and/or length of the cantilever-like lift-off element.

The lift-off element can thus be designed with the function of pressure spring and can exert a compressive force between clamping jaw and support member, which counteracts the clamping force exerted by the clamping jaw on the cutting element and thus exerts a restoring force on the clamping jaw. An elastic force, which has a restoring effect, can keep open the access to a recess on the support member, which accommodates the cutting element in response to released clamping screw, and can thus facilitate a change of the cutting element.

In the alternative, however, the lift-off element can also be designed with the function of a tension spring and can exert a tensile force between a lever end located at a distance from the cutting element and the support member, for example when the clamping jaw is formed in the manner of a two-sided lever. As in the case of the formation as one-sided lever, the access to a recess on the support member, which accommodates the cutting element, can thereby be kept open in response to a released clamping screw, and a change of the cutting element can thus be facilitated.

The clamping jaw can be connected to the support member in an articulated manner. The articulated connection (hereinafter referred to as joint) can be established via a single-piece formation or a substance-to-substance bond, non-positive and/or positive connection between clamping jaw and support member. The clamping jaw can for example be connected to the support member via a hinge joint.

The joint, in particular hinge joint, is a rotary joint, which connects the clamping jaw to the support member, comprising exactly one degree of freedom, which allows for a rotational movement in exactly one plane and thus captively connects the clamping jaw to the support member at least in a direction transversely to the joint axis. Unwanted relative movements of the clamping jaw relative to the support member are thus ruled out from the start. By means of the unchangeable position of the rotational or joint axis, respectively, of the hinge joint on the support member, the clamping jaw is thus furthermore fixed unambiguously in its position radially or transversely to the rotational or joint axis, respectively, and in its angular orientation relative to the rotational or joint axis, respectively, and thus to the support member.

The joint thereby comprises a clamping jaw-side part, which is to be assigned to the clamping jaw, and a support member-side part, which is to be assigned to the support member, which are connected to one another in a rotationally movable manner. The two joint parts can be connected to one another in a rotationally movable manner, e.g. either indirectly by means of a pin or directly by means of a positive connection.

Due to the fact that the radial position and the angular orientation of the clamping jaw are fixed relative to the rotational or joint axis, respectively, of the joint, a cutting tool can thus be created by means of the solution according to the invention, which is characterized by a construction, which can be realized in a technically simple manner, which provides for a reproducible positionally accurate and stable clamping of a cutting element on the support member by means of few, simple hand movements. As compared to the construction proposed in DE 10 2008 063 127 A1, however, additional advantages are also obtained with the solution according to the invention. The cutting tool according to the invention is thus characterized by a higher flexibility with regard to the use of cutting inserts of different sizes, or an independent exchange of the support member and/or of the clamping jaw. The solution according to the invention furthermore provides the opportunity to combine different materials as materials for the support member and the clamping jaw. For example, the clamping jaw can be made of a material, which is of higher strength than the support member. By means of the formation of the lift-off element between the support member and the clamping jaw, the clamping jaw is lifted off the support member in response to releasing the clamping screw, whereby a cutting element change can be carried out in a simple and secure manner.

In a preferred embodiment, the two parts of the joint are directly connected to one another transversely to the joint axis by means of a positive connection. By means of the positive connection, the number of the components can be kept small. For this purpose, the clamping jaw can have a roller-shaped joint head as the clamping jaw-side part of the joint, and the support member can have a trough-shaped joint socket, which supports the joint head in a positive manner, or vice versa, the support member can have a roller-shaped joint head as the support member-side part, and the clamping jaw can have a through-shaped joint socket, which supports the joint head in a positive manner.

From a manufacturing-related aspect, it is advantageous when the clamping jaw has, on its joint-side end, a roller-shaped joint head, which is supported in a trough-shaped joint socket formed on the support member, at a predetermined distance to the cutting insert.

Regardless of whether the clamping jaw is now directly or indirectly connected to the support member, it can be formed as one-sided lever with the joint as pivotal point, e.g. based on the model according to DE 10 2008 063 127 A1, or as a double-sided lever (for example in the manner of a rocker) with the joint in the center, e.g. based on the model according to DE 90 15 969.1 U1.

The formation as one-sided lever is advantageous insofar as the overall length of the clamping jaw can be kept small thereby. Based on the model according to the solution specified in DE 10 2008 063 127 A1, the clamping jaw can advantageously clamp the cutting element against the support member with its lever end, which is located at a distance from the joint, and the clamping screw can be located in the region between the joint and the cutting element in this case. The lift-off element according to the invention can thereby be located in the region between the joint and the clamping screw and can exert a compressive force, which pushes the clamping jaw away from the support member. In the alternative, the clamping screw can be located on the lever end of the clamping jaw located at a distance from the joint, and the clamping jaw can clamp the cutting element against the support member in the region between the joint and the clamping screw. The lift-off element according to the invention can either be located in the region between the joint and the cutting element or in the region between the cutting element and the clamping screw in this case, and can exert a compressive force, which pushes the clamping jaw away from the support member.

For the case that the clamping jaw is formed as a double-sided lever, the clamping screw can be located in the region between the joint and the cutting element or, as in DE 90 15 969.1 U1, in the region between the joint and the lever end of the clamping jaw located at a distance from the cutting element. The lift-off element according to the invention can be located on each of the two sides of the joint. Depending on whether the lift-off element is located in the region between the joint and the lever end of the clamping jaw located close to the cutting element or in the region between the joint and the lever end of the clamping jaw located at a distance from the cutting element, it can exert a compressive or tensile force in such a way that the clamping jaw is pushed away or lifts off from the cutting element located on the support member. If the clamping screw is located in the region between the joint and the cutting element, a pressure spring can additionally furthermore be located for example between the lever end of the clamping jaw located at a distance from the cutting element, and the support member, by means of which pressure spring the lever end of the clamping jaw, which clamps against the cutting element, experiences a spring biasing force in the direction of cutting element or support member, respectively.

In a preferred embodiment, in which the clamping jaw is realized as a one-sided lever, the lift-off element is thus located in a region between the joint and the cutting element, in particular between the joint and the clamping screw. In the alternative, the lift-off element can, however, also be located in a region between the clamping screw and the cutting element.

In the case that the clamping jaw is realized as double-sided lever, the above-described lift-off element can be located between the joint and the lever end of the clamping jaw located at a distance from the cutting element. In the alternative, the lift-off element, as in the case of the formation of the clamping jaw as one-sided lever, can, however, also be located in the region between the joint and the cutting element.

Independently of the above-described possibilities for arranging the clamping screw and the cutting element relative to the joint and the above-described clamping jaw designs, a spring, e.g. helical or plate spring, can additionally be located between the support member and the clamping jaw, which spring applies an elastic force to the clamping jaw, which either counteracts the clamping force exerted on the cutting element by the clamping jaw and thus exerts a restoring force on the clamping jaw, or in the same direction as the clamping force, which is exerted by the clamping jaw. The elastic force, which has a restoring effect, like the elastic force of the lift-off element, can facilitate a change of the cutting element, in that it keeps open the access to a recess on the support member, which accommodates the cutting element, in response to released clamping screw.

In a preferred embodiment, the clamping screw, which clamps the clamping jaw against the support member or the cutting element located on the support member, respectively, is screwed to the clamping jaw in an axially fixed, but rotationally movable manner, and is screwed in the support member. For this purpose, the clamping screw can be located in a through bore in the clamping jaw and can be screwed in the support member for example based on the model according to the solution specified in DE 10 2008 063 127 A1.

In the alternative, the clamping screw can be supported in an axially fixed, but rotationally movable manner in the support member and can be screwed to the clamping jaw.

Independently of the design of the lift-off element, of the joint, of the realization of the clamping jaw as one- or two-sided lever, of the realization of the clamping screw and the arrangement of the lift-off element, the cutting element is preferably positioned in a recess provided on the support member in a positionally accurate manner. A positionally accurate positioning of the cutting element on the support member can be attained for example by means of a positive accommodation of the cutting element in a recess, which is adapted to the contour of the cutting element.

To prevent that the cutting element experiences a force component parallel to the joint axis by means of the clamping force, which is transmitted via the clamping jaw, the recess can furthermore have a bottom surface, which is parallel to the joint axis and on which the cutting element is located. This measure additionally contributes to a positionally accurate positioning of the cutting element on the support member.

In each of the above-discussed embodiments of the cutting tool, the cutting element can be located in a positionally adjustable manner on the support member. For example, the cutting element can be supported so as to be positionally adjustable radially or axially on a conical screw, which is screwed in the support member, based on the model according to DE 10 2008 063 127 A1.

A cutting tool according to the invention can be realized as a stationary cutting tool, e.g. as turning tool, or can be realized as a machining tool, which rotates around a longitudinal central axis as rotational axis, e.g. as a drilling, milling, reaming or countersinking tool.

In the case of a rotating cutting tool, the cutting element can be located on the support member in such a way that it cuts on the front and/or circumferential side.

The rotational or joint axis, respectively, of the joint can furthermore be aligned parallel or transversely, in particular at right angles to the rotational or longitudinal central axis, respectively, of the cutting tool.

A recess on the support member accommodating the cutting element can furthermore be realized in such a way that the support member can be equipped with the cutting element on the front or outer circumferential side.

The cutting tool according to the invention is to thus not be limited to a certain tool type. The concept for clamping a cutting element to a support member specified in the claims and discussed above can in fact be used—insofar as technically practicable—for different stationary or rotating tool types and tools for clamping cutting elements, which are to be supported axially and/or radially.

Different embodiments of a cutting tool according to the invention will be described below by means of the enclosed drawings.

FIG. 1 to FIG. 5 illustrate a preferred first embodiment of a cutting tool according to the invention in the form of a cutting tool rotating around the rotational axis 3 for machining a bore. The cutting tool has a support member 10, a cutting element 30 releasably located on the support member 10, a clamping jaw 20 connected to the support member 10 via a hinge joint 50 in a rotationally movable manner, for clamping the cutting element 30 against the support member 10, and a clamping screw 40 for clamping and fixing the clamping jaw 20 against the cutting element 30.

The support member 10 of the cutting tool has a usual clamping shaft, which is not shown in detail in the figures, for clamping into a tool holder, which is also not shown.

Figure 1:
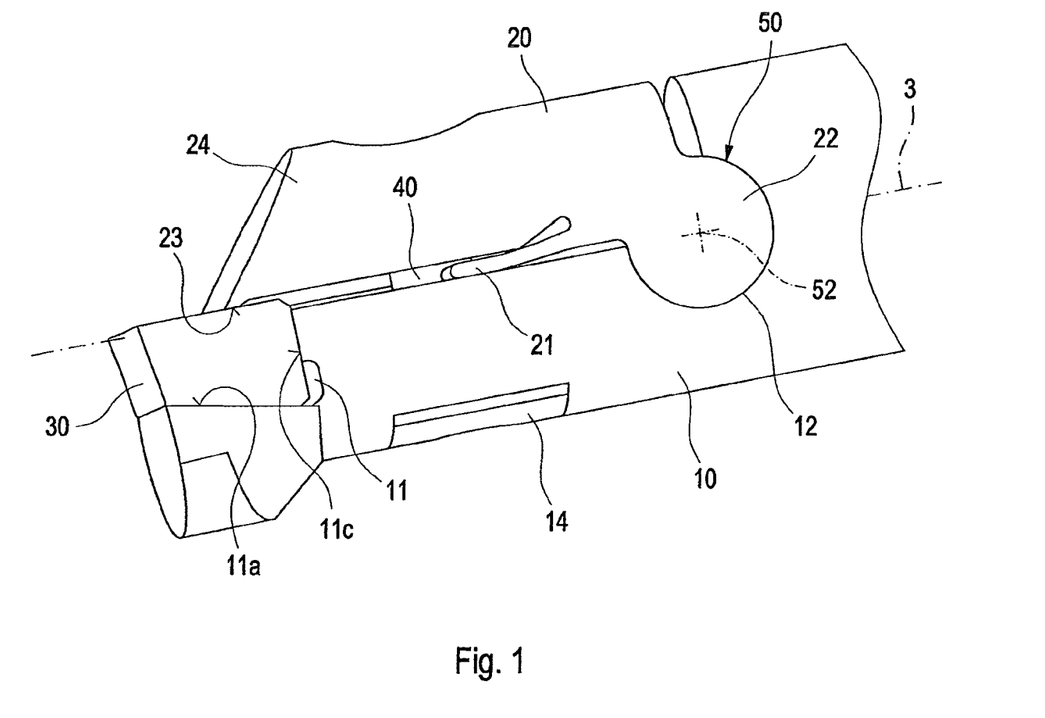
FIG. 1 shows a perspective side view of a front and circumferential-side cutting part section of a first embodiment of a cutting tool according to the invention.
Figure 2:
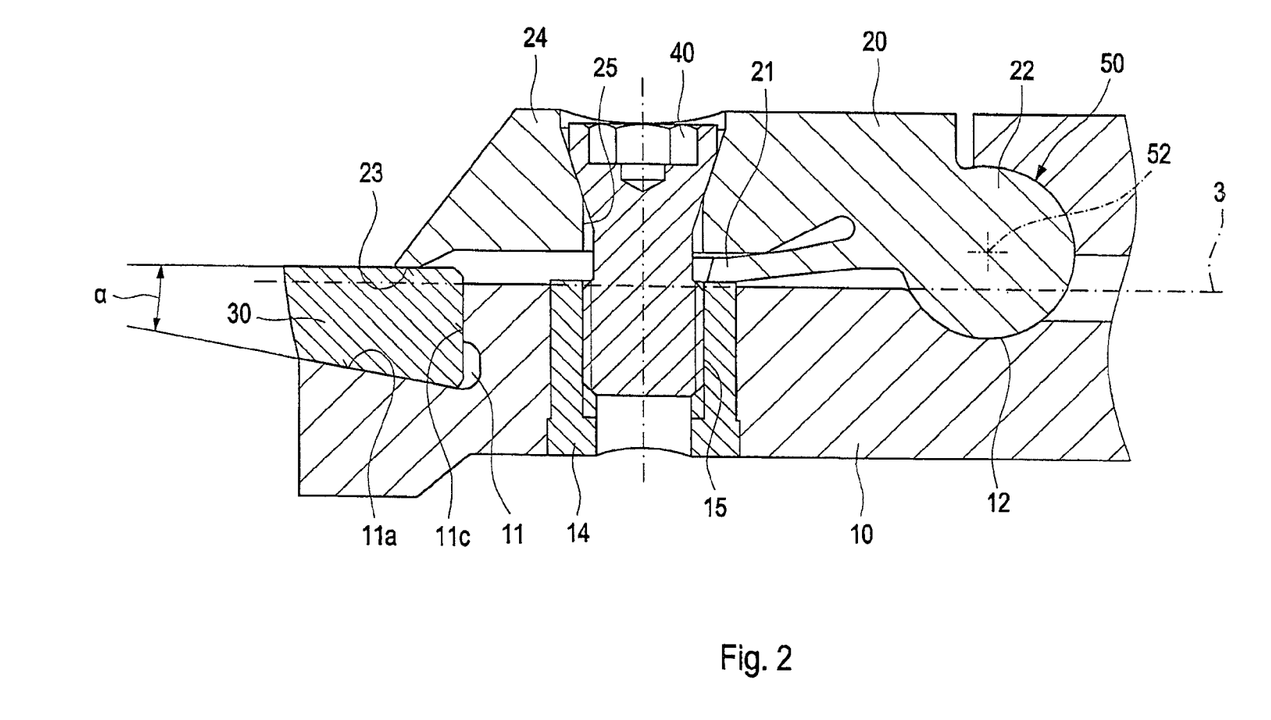
FIG. 2 shows a longitudinal section of the cutting part section from FIG. 1.
Figure 3:
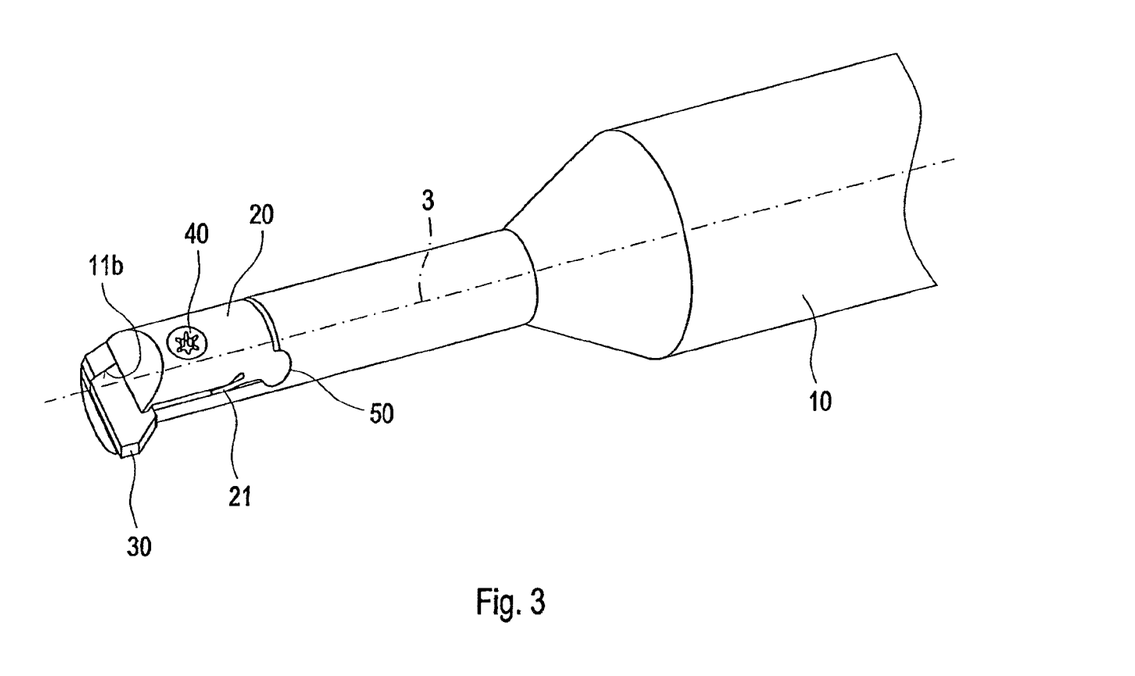
FIG. 3 shows a perspective top view of the cutting part section from FIG. 1.

It can be seen from FIG. 1 to FIG. 3 that the support member 10 has an angular recess 11, which can be accessed on the front and circumferential side and in which the cutting element 30 sits in a positive manner.

The clamping jaw 20, which is connected to the support member 10 via the hinge joint 50 in a rotationally movable manner, is held at a slight distance to the support member 10 in the clamped state shown in the figures. The clamping jaw 20 extends from the hinge joint 50 substantially axially parallel in the direction of the tool front side. In the first embodiment, the hinge joint 50 has a rotational or joint axis 52, respectively, which stands at right angles to the rotational axis 3, and around which the clamping jaw 20 can be pivoted relative to the support member 10.

The hinge joint 50 is a rotary joint, which connects the clamping jaw 20 to the support member 10, comprising exactly one degree of freedom, which allows for a rotational movement in exactly one plane and captively connects the clamping jaw 20 to the support member 10 at least in a direction transversely to the rotational or joint axis 52, respectively. The hinge joint 50 comprises a clamping jaw-side part 22, which is to be assigned to the clamping jaw 20, and a support member-side part 12, which is to be assigned to the support member 10, which are connected to one another in a rotationally movable manner. In the first embodiment, the two hinge joint parts 12, 22 are directly connected to one another in a rotationally movable manner by means of a positive connection. For this purpose, the clamping jaw 20 has a roller-shaped joint head as the clamping jaw-side part 22, and the support member 10 has a through-shaped joint socket, which supports the joint head in a positive manner, as the support member-side part 12.

As the figures show, the clamping jaw is formed as a one-sided lever with the hinge joint as pivot point. With its lever end, which is located at a distance from the joint, the clamping jaw clamps the cutting element against the support member. The clamping screw is located in the region between the hinge joint and the cutting element.

The clamping screw 40, which clamps the clamping jaw 20 against the support member 10 or the cutting element 30 located on the support member 10, respectively, is supported on the clamping jaw 20 in an axially fixed, but rotationally movable manner, and is screwed in the support member 10. The clamping screw 40 is in particular supported in a through bore 25 in the clamping jaw 20 in an axially fixed, but rotationally movable manner, and is screwed in a threaded bore 15, which is aligned with the through bore 25, in the support member 10. In the first embodiment, the threaded bore 15 is provided in a threaded bushing 14, which is integrated in the support member 10. In the first embodiment, the clamping screw 40 is furthermore realized so as to be based on the model according to the solution specified in DE 10 2008 063 127 A1. With regard to constructional details, reference shall thus be made to the corresponding embodiments in DE 10 2008 063 127 A1.

On its lever end 24, which is located at a distance from the hinge joint, the clamping jaw 20 has a pressure surface 23, which clamps the cutting element 30 against a bottom surface 11a of the recess 11 on the support member 10. The bottom surface 11a, which is inclined towards the hinge joint 50, draws an acute angle α with the pressure surface 23 on the clamping jaw 20. Thanks to the acute angle α, the bottom surface 11a acts as inclined surface, by means of which the cutting element 30 experiences a force component in the axial direction to the hinge joint 50 in response to clamping against the support member 10. By means of this force component, it is attained that the cutting element 30 strikes axially against a front-side wall surface 11c of the recess 11 on the support member 10 in response to clamping. The wall surface 11c thus forms an axial stop on the support member 10 for the cutting element 30. In the radial direction, an inner wall surface lib of the recess 11 forms a radial stop on the support member 10 for the cutting element 30.

It can be seen from FIGS. 1 to 5 that a lift-off element 21 is located between the support member 10 and the clamping jaw 20. The lift-off element 21 is formed in the manner of an elastically deformable cantilever and is located between the support member 10 and the clamping jaw 20 in such a way that, as a result of elastic deformation in the case of a tightened clamping screw 40 (see FIGS. 1 to 3), it exerts a compressive force between clamping jaw 20 and support member 10. In the first embodiment, the lift-off element 21 is formed in a single piece with the clamping jaw 20. In the longitudinal direction of the cutting tool, the lift-off element 21 is located in a region between the hinge joint 50 and the cutting element 30, in particular between the hinge joint 50 and the clamping screw 40.

In FIGS. 1 to 3, the clamping jaw 20 is clamped against the cutting element 30 held on the support member 10 by means of the clamping screw 40. In this state, the lift-off element touches the underside of the clamping jaw 20 as well as the upper side of the support member 10, and exerts a compressive force, which is oriented away from the support member 10, i.e. which acts in the release direction, on the clamping jaw 20. However, there does not need to be a contact between the lift-off element 21 and the underside of the clamping jaw 20, in order to create a compressive force between clamping jaw 20 and support member 10 by means of an elastic deformation.

Figure 4:
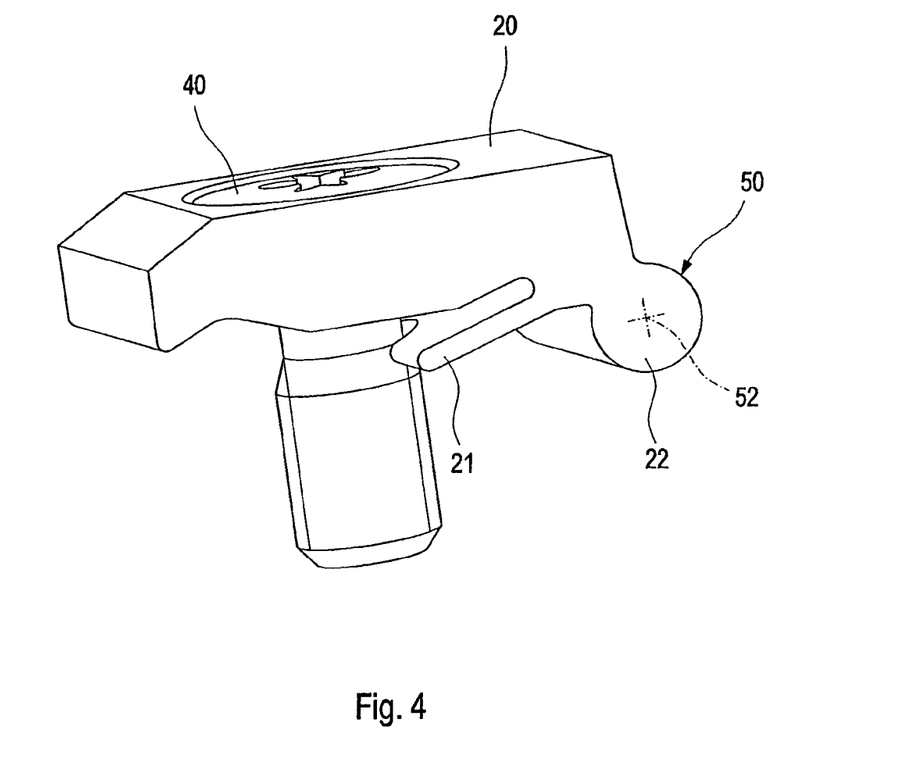
FIG. 4 shows a perspective side view of the clamping jaw comprising lift-off element and clamping screw in the released state.
Figure 5:
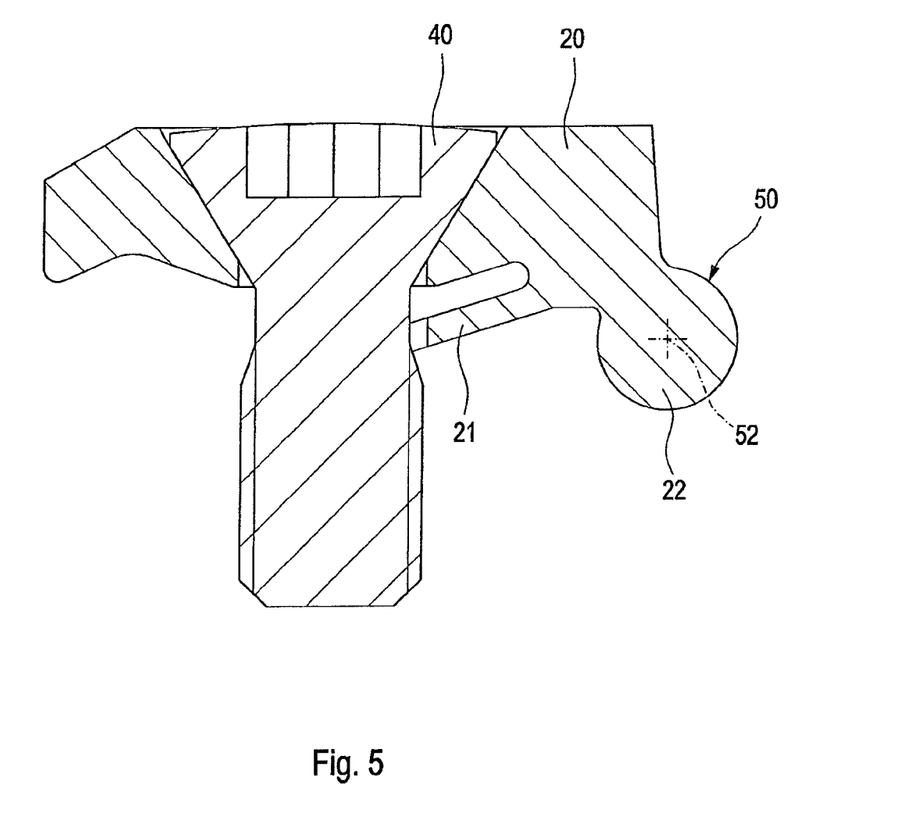
FIG. 5 shows a longitudinal section of the clamping jaw from FIG. 4.

FIGS. 4 and 5, in contrast, show the clamping jaw 20 comprising the lift-off element 21 and the clamping screw 40 in an unscrewed state. Here, the lift-off element 21 does not touch the underside of the clamping jaw 20 and does not exert a compressive force on the clamping jaw 20.

To equip the support member 10 with the cutting element 30, the cutting element 30 is initially placed into the recess 11 provided on the support member 10 between clamping jaw 20 and support member 10, and is pushed radially inwards, until the cutting element 30 strikes against the inner wall surface 11b of the recess 11. In this state, the cutting element 30 can then be clamped in the recess 11 on the support member 10 with the help of the clamping jaw 20. For this purpose, the clamping jaw 20 is clamped against the cutting element 30 located in the recess 11 or against the support member 10, respectively, by means of the clamping screw 40. By tightening the clamping screw 40, the lift-off element 21 located between the clamping jaw 20 and the support member 10 is deformed elastically in such a way that it applies a compressive force on the clamping jaw 20, which counteracts the clamping force exerted on the cutting element 30 by the clamping jaw 20.

To change the cutting element 30, the clamping screw 40 is initially released. The lift-off element 21 with its restoring force, which counteracts the clamping force of the clamping jaw 20, thereby ensures that the clamping jaw 20 loosens and is lifted off the support member 10. In this state, the cutting element 30 can be removed from the recess 11. The recess 11 can subsequently be cleaned and a new cutting element can be inserted into the recess 11.

The tool 1 according to the invention thus provides for a simple and secure equipping of the support member 10 with the cutting element 30 with few simple hand movements, whereby non-productive downtimes can be reduced. The subsequent clamping of the cutting element does not lead to a dimensional change of the position of the cutting element 30 relative to the support member 10, thus resulting in a machining accuracy, which remains constant.

Figure 6:
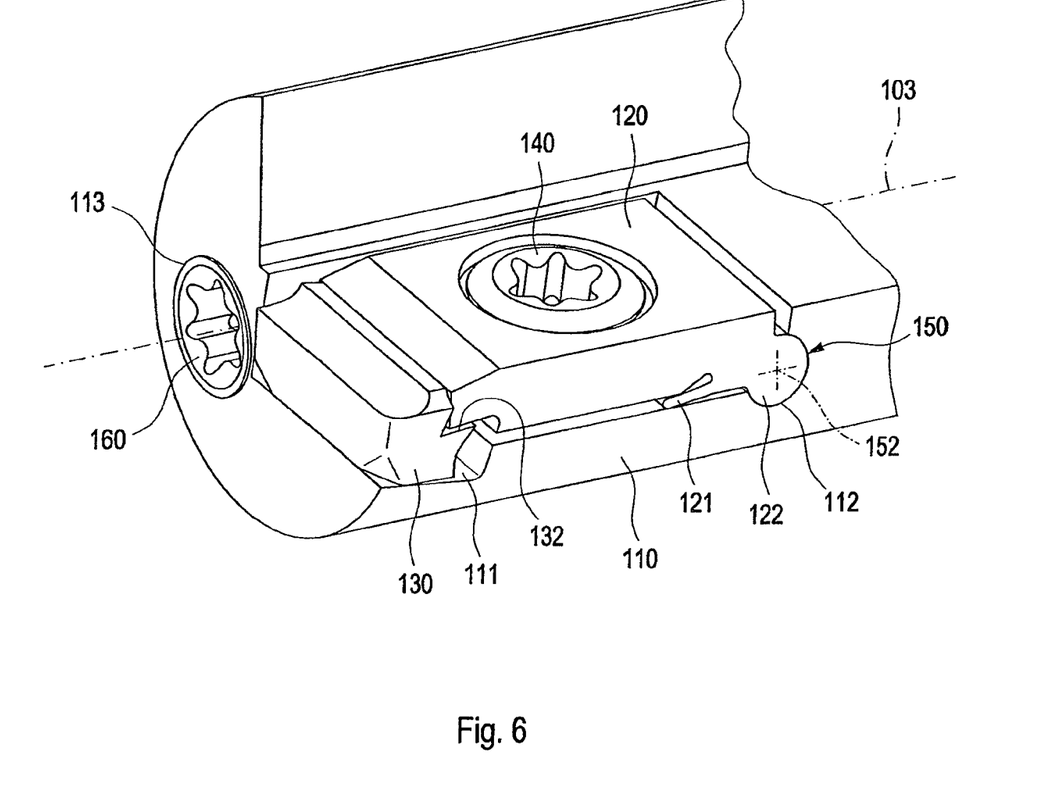
FIG. 6 shows a perspective view of a cutting part section of a second embodiment of a cutting tool according to the invention.

FIG. 6 shows a second embodiment of a cutting tool according to the invention. The second embodiment essentially differs from the first embodiment only by the position of the axial and radial stop for the cutting element 130 on the support member 110.

In the first embodiment, an inner wall surface 11b of the recess 11 forms a radial stop for the cutting element 30 on the support member 10. In the second embodiment, the radial stop for the cutting element 130 is formed by a conical screw 160, which is screwed into an accommodating bore 113 in the support member 110, which can be accessed on the front side. The conical screw 160 is realized according to the model of the conical screw proposed in DE 10 2008 063 127 A1 and is located in the support member 110. With regard to the constructional details, reference is thus made to the corresponding explanations in DE 10 2008 063 127 A1.

In the first embodiment, the clamping jaw 30 in FIGS. 1 and 2 furthermore pushes against the cutting element 30 from the top. In the second embodiment, the clamping jaw 120, in contrast, engages with a rear-side recess 132 on the cutting element 130 according to the model of the cutting element arrangement proposed in DE 10 2008 063 127 A1, so that the clamping jaw 120 provides a radial stop for the cutting element 130. In contrast to the first embodiment, in which the axial stop and radial stop for the cutting element 30 through the recess 11 (wall surfaces 11b, 11c) are provided directly on the support member 10, the axial stop and radial stop for the cutting element 130 located in the recess 111 are provided on the clamping jaw 120 or conical screw 160, respectively, in the second embodiment.

The invention has been described above by means of two embodiments of a rotating tool for bore machining, e.g. of a drilling, milling, reaming or countersinking tool. In the first and second embodiment, the cutting element 30, 130 is located in a recess 11, 111, which is aligned radially relative to the rotational or longitudinal central axis, respectively, of the cutting tool, on the support member 20, 120 and is supported in the axial and radial direction.

However, the concept according to the invention of the articulation and attaching of a clamping jaw on a support member via a hinge joint can also be used for other cutting tool types. Examples for such other cutting tool types are illustrated in FIGS. 7 to 9.

Figure 7:
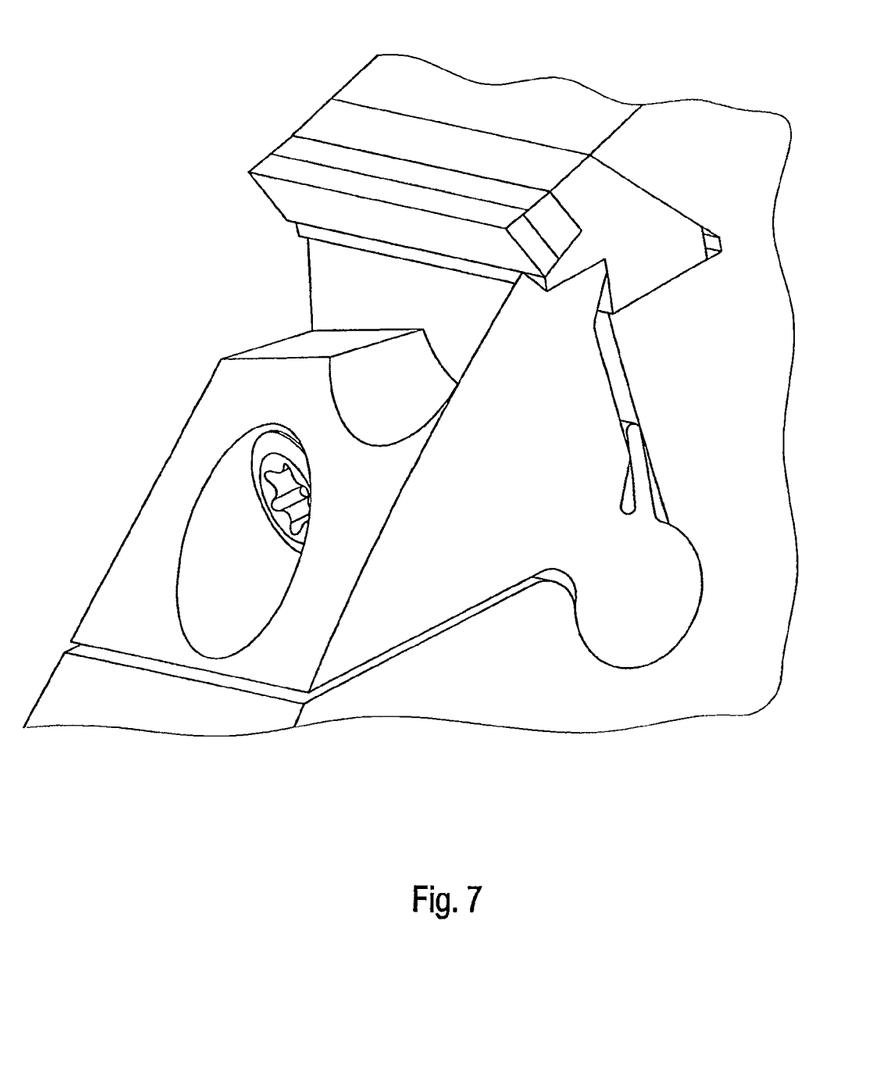
FIG. 7 shows a perspective view of a cutting part section of a third embodiment of a cutting tool according to the invention.
Figure 8:
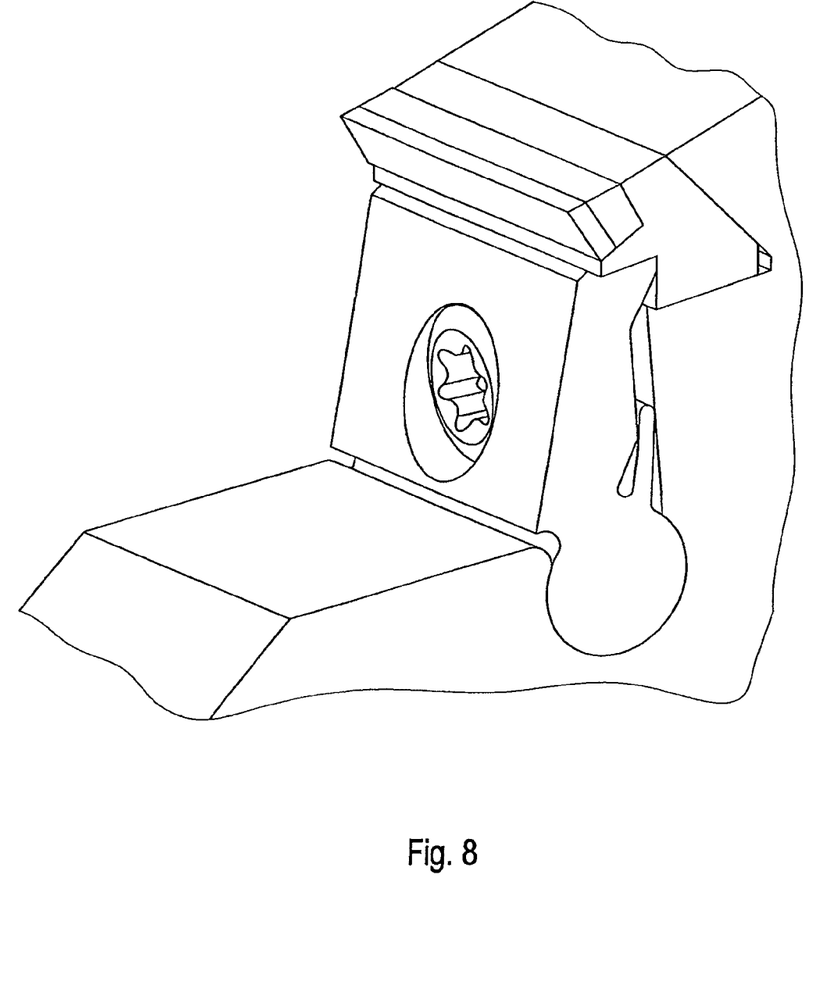
FIG. 8 shows a perspective view of a cutting part section of a fourth embodiment of a cutting tool according to the invention.
Figure 9:
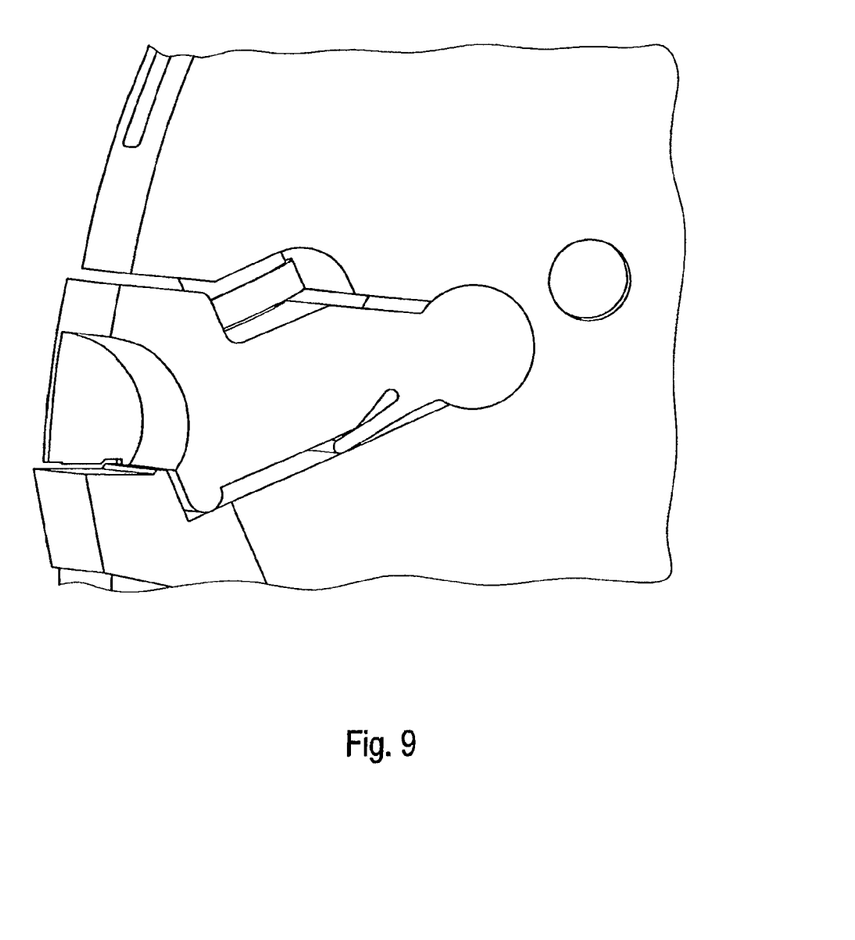
FIG. 9 shows a perspective view of a cutting part section of a fifth embodiment of a cutting tool according to the invention.

FIGS. 7 to 9 show rotating cutting tools in the form of milling heads equipped with cutting elements for milling. Such milling heads are generally known to the person of skill in the art, so that no further explanations are required. In contrast to the first and second embodiment, the rotational or joint axis, respectively, of the hinge joint between the clamping jaw, which clamps the cutting element against the support member, is aligned parallel with the rotational axis of the cutting tools in the embodiments shown in FIGS. 7 to 9. In the third and fourth embodiment shown in FIG. 7 or 8, respectively, the clamping screw is in each case held on the clamping jaw in an axially fixed, but rotationally movable manner—as in the first and second embodiment—and is screwed in the support member. In the fifth embodiment shown in FIG. 9, the clamping screw, in contrast, is only screwed to the support member, namely in such a way that, in FIG. 9, it pushes against the clamping jaw from the top in the clamping direction. In FIG. 9, the clamping screw thus does not engage with the clamping jaw.

In FIGS. 1 to 9, the lift-off element is formed in a single piece with the clamping jaw. However, it can also be connected to the clamping jaw by means of a substance-to-substance bond, in a non-positive and/or positive manner.

In the above-described embodiments, the lift-off element is provided on the side of the clamping jaw. In the alternative, the lift-off element can be provided on the side of the support member. What is essential is only that the lift-off element acts between the support member and the clamping jaw in such a way that it applies a force, which pushes or lifts the clamping jaw away off the support member in response to releasing the clamping screw.

In the shown embodiments, the lift-off element is designed with the function of a pressure spring and exerts a compressive force between clamping jaw and support member. It can, however, also be designed with the function of a tension spring and can exert a tensile force between clamping jaw and support member.

In the preferred embodiment, in which the clamping jaw is designed as one-sided lever, the lift-off element is located in a region between the joint and the cutting element, in particular between the joint and the clamping screw. In the alternative, the lift-off element, however, can also be located in a region between the clamping screw and the cutting element.

In the case that the clamping jaw is realized as a (non-illustrated) double-sided lever, the lift-off element can be located between the joint and the lever end of the clamping jaw, which is located at a distance from the cutting element. In the alternative, however, the lift-off element can also be located, as in the case of the formation of the clamping jaw as one-sided lever, in the region between the joint and the cutting element.

FIGS. 1 to 3 and 6 to 9 each only show one cutting element. It goes without saying that a cutting tool according to the invention can, however, be equipped with more than one cutting element. In this case, each cutting element can be attached to a support member by means of an assigned clamping jaw.

The clamping concept according to the invention, as it is described in the claims or in the introductory part of the description, it thus not limited to the cutting tool shown in the Figures, but can be used for various—rotating or stationary—cutting tools, in order to releasably attach a cutting element to a support member with the help of a clamping jaw.

In the case of a rotating cutting tool, the cutting element can be located on the support member in such a way that it cuts on the front and/or circumferential side.

The rotational or joint axis, respectively, of the joint can furthermore be aligned parallel or transversely, in particular at right angles, to the rotational or longitudinal central axis, respectively, of the cutting tool.

A recess accommodating the cutting element on the support member can furthermore be realized in such a way that the support member can be equipped with the cutting element on the front or outer circumferential side.

Deviating from the above-described embodiments, the joint between clamping jaw and support member can further be realized in such a way that the support member has a roller-shaped joint head as the support member-side part, and the clamping jaw has a trough-shaped joint socket, which supports the joint head in a positive manner.

In the alternative, the joint can be realized in such a way that the part on the clamping jaw side and the part on the support member side can be indirectly connected to one another in a rotationally movable manner by means of a pin.

Regardless of whether the clamping jaw is connected directly, as in the above-described embodiments, or, in the alternative, indirectly to the support member, it can be realized as a double-sided lever (or in the manner of a rocker, respectively), comprising a centrally located joint, e.g. Baa on the model of DE 90 15 969.1 U1 or DE 44 30 197 A1. As specified above, the realization as one-sided lever can be advantageous to keep the overall length of the clamping jaw small. In this case, based on the model of the solution specified in DE 10 2008 063 127 A1, the clamping jaw can advantageously clamp the cutting element with its lever end, which is located at a distance from the joint, against the support member, and the clamping screw can be located in the region between the joint and the cutting element. In the alterative, the clamping screw can be located on the lever end of the clamping jaw located at a distance from the joint, and the clamping jaw can clamp the cutting element against the support member in the region between the joint and the clamping screw.

In the case that the clamping jaw is formed as double-sided lever, the clamping screw can be located in the region between the joint and the cutting element or as in DE 90 15 969.1 U1 or DE 44 30 197 in the region between the joint and the lever end of the clamping jaw located at a distance from the cutting element. If the clamping screw is located in the region between the joint and the cutting element, a pressure spring can furthermore be located for example between the lever end of the clamping jaw located at a distance from the cutting element, and the support member, by means of which pressure spring the lever end of the clamping jaw, which clamps against the cutting element, experiences a spring biasing force in the direction of cutting element or support member, respectively.

As alternative to the first, second, third and fourth embodiment, in which the clamping screw is supported in an axially fixed, but rotationally movable manner on the clamping jaw and is screwed to the support member, the clamping screw can furthermore be supported in an axially fixed, but rotationally movable manner in the support member and can be screwed to the clamping jaw.

Independently of the above-described possibilities for arranging the clamping screw and the cutting element relative to the joint and the above-described clamping jaw designs, a spring means, e.g. a helical or plate spring, can additionally be located between the support member and the clamping jaw, which applies an elastic force to the clamping jaw, which counteracts the clamping force exerted on the cutting element by the clamping jaw and thus exerts a restoring force on the clamping jaw. The elastic force, which has a restoring effect, like the elastic force of the lift-off element, can facilitate a change of the cutting element, in that it keeps open the access to a recess on the support member, which accommodates the cutting element, in response to released clamping screw.

The invention claimed is:

1. A cutting tool, comprising:
a support member,
a cutting element, which is releasably clamped to the support member,
a clamping jaw, which is located on the support member and can be fixed by a clamping screw and which clamps the cutting element against the support member, and
a lift-off element which is integral with the clamping jaw, and which is between the support member and the clamping jaw, and which lifts the clamping jaw off the cutting element located on the support member in response to releasing the clamping screw.

2. The cutting tool according to claim 1, wherein the lift-off element is formed as a single piece with the clamping jaw.

3. The cutting tool according to claim 1, wherein the lift-off element is connected to the clamping jaw by of a substance-to-substance bond, in a non-positive and/or positive manner.

4. The cutting tool according to claim 1, wherein the lift-off element projects away from the clamping jaw in an elastically deformable manner.

5. The cutting tool according to claim 1, wherein the lift-off element is designed in such a way that it exerts a compressive force between the clamping jaw and the support member in response to tightened clamping screw.

6. The cutting tool according to claim 1, wherein the lift-off element is designed in such a way that it exerts a tensile force between the clamping jaw and the support member in response to tightened clamping screw.

7. The cutting tool according to claim 1, wherein the clamping jaw is connected to the support member in an articulated manner.

8. The cutting tool according to claim 7, wherein the lift-off element is located in a region between a joint and the cutting element, the joint between the clamping jaw and the support element.

9. The cutting tool according to claim 7, wherein the clamping jaw is connected to the support member via a hinge joint.

10. The cutting tool according to, claim 7, wherein the clamping jaw is connected to the support member in a positive manner in a direction transversely to an axis of a joint between the clamping jaw and the support element.

11. The cutting tool according to claim 7, wherein the cutting tool further comprises a joint head provided on the clamping jaw, and a joint socket, which is provided on the support member and in which the joint head is accommodated in a rotationally movable manner.

12. The cutting tool according to claim 7, wherein the clamping jaw forms a one-sided lever with a joint as pivotal point, the joint between the clamping jaw and the support element.

13. The cutting tool according to claim 1, wherein the clamping screw is supported on the clamping jaw in an axially fixed, but rotationally movable manner, and is screwed in the support member.

14. The cutting tool according to claim 1, wherein the clamping screw is supported in an axially fixed, but rotationally movable manner in the support member and is screwed to the clamping jaw.

15. The cutting tool according to claim 7, wherein the clamping screw is located in a region between a joint and the cutting element, the joint between the clamping jaw and the support element.

16. The cutting tool according to claim 1, wherein a pressure or tension spring, which applies a tensile force to the clamping jaw, is located between the support member and the clamping jaw.

17. The cutting tool according to claim 1, wherein the cutting element is located in a recess provided on the support member.

18. The cutting tool according to claim 17, wherein the recess has a bottom surface, which is parallel to an axis of a joint between the clamping jaw and the support element.

19. The cutting tool according to claim 1, wherein the cutting element is located in a positionally adjustable manner on the support member.

20. The cutting tool according to claim 19, wherein the cutting element is supported in a positionally adjustable manner on a conical screw, which is screwed in the support member.

21. The cutting tool according to claim 1, wherein the cutting tool is a cutting tool that rotates around a longitudinal central axis.

22. The cutting tool according to claim 21, wherein the cutting element cuts on a front and/or circumferential side.

23. The cutting tool according to claim 21, wherein the support member can be equipped with the cutting element on a front or outer circumferential side.

24. The cutting tool according to claim 1, wherein the cutting tool is a rotating machining tool.

25. A cutting tool, comprising:
a support member,
a cutting element, which is releasably clamped to the support member,
a clamping jaw, which is located on the support member and can be fixed by a clamping screw and which clamps the cutting element against the support member, and
a lift-off element which is an elastically deformable cantilever, and which is between the support member and the clamping jaw, and which lifts the clamping jaw off the cutting element located on the support member in response to releasing the clamping screw.

26. A cutting tool, comprising:
a support member,
a cutting element, which is releasably clamped to the support member,
a clamping jaw, which is connected to the support member via a hinge joint, and the clamping jaw can be fixed by a clamping screw and which clamps the cutting element against the support member, and
a lift-off element which is between the hinge joint and the cutting element, and which is between the hinge joint and the clamping screw, and which is between the support member and the clamping jaw, and which lifts the clamping jaw off the cutting element located on the support member in response to releasing the clamping screw.

27. A cutting tool, comprising:
a support member,
a cutting element, which is releasably clamped to the support member,
a clamping jaw, which is located on the support member and can be fixed by a clamping screw and which clamps the cutting element against the support member, and
a lift-off element which is integral with the support member, and which is between the support member and the clamping jaw, and which lifts the clamping jaw off the cutting element located on the support member in response to releasing the clamping screw.

28. A cutting tool, comprising:
a support member,
a cutting element, which is releasably clamped to the support member,
a clamping jaw, which is connected to the support member in a rotationally movable manner which allows for rotational movement of the clamping jaw relative to the support member in exactly one plane, and which can be fixed by a clamping screw, and which clamps the cutting element against the support member, and
a lift-off element which is between the clamping screw and the cutting element, and which is between the support member and the clamping jaw, and which lifts the clamping jaw off the cutting element located on the support member in response to releasing the clamping screw.

* * * * *